United States Patent
Takahashi

(10) Patent No.: US 7,012,719 B1
(45) Date of Patent: Mar. 14, 2006

(54) SIGN SENSITIVE APERTURE CORRECTION SYSTEM AND METHOD

(75) Inventor: Sadao Takahashi, Kanagawa (JP)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/338,622

(22) Filed: Jun. 23, 1999

(30) Foreign Application Priority Data

Jun. 25, 1998 (JP) .................................. 10-193612

(51) Int. Cl.
*H04N 1/04* (2006.01)
(52) U.S. Cl. .................. 358/474; 525/504; 525/518; 382/167; 382/162; 348/272; 348/273
(58) Field of Classification Search ................ 358/474, 358/525, 532, 505, 428, 504, 518, 537, 406, 358/448, 461, 475; 382/167, 162, 272; 348/273, 348/272
See application file for complete search history.

(56) References Cited

U.S. PATENT DOCUMENTS

| | | | | |
|---|---|---|---|---|
| 5,508,823 A | * | 4/1996 | Kiyohara | 358/463 |
| 5,696,593 A | * | 12/1997 | Chiba | 358/296 |
| 5,886,797 A | * | 3/1999 | Shimura | 358/455 |
| 6,415,053 B1 | * | 7/2002 | Norimatsu | 382/199 |

FOREIGN PATENT DOCUMENTS

JP   8-9199   1/1996

* cited by examiner

*Primary Examiner*—Mark Wallerson
*Assistant Examiner*—Negussie Worku
(74) *Attorney, Agent, or Firm*—Knoble Yoshida & Dunleavy LLC

(57) ABSTRACT

The aperture correction system variably adjusts a correction efficient value based upon a sign and an original relative light intensity value or its equivalent. Because the correction is relative light intensity sensitive, the aperture correction is optimized, and the average light intensity is maintained before and after the aperture correction for natural appearance of the image.

24 Claims, 8 Drawing Sheets

FIG. 6(a)

| Cy | Ye | Cy | Ye |
|----|----|----|----|
| Mg | G  | Mg | G  |
| Cy | Ye | Cy | Ye |
| G  | Mg | G  | Mg |

FIG. 6(b)

| G | R | G | R |
|---|---|---|---|
| B | G | B | G |
| G | R | G | R |
| B | G | B | G |

SIGN SENSITIVE APERTURE CORRECTION SYSTEM AND METHOD

FIELD OF THE INVENTION

The current invention is generally related to image data correction, and more particularly related to an aperture correction process for image data.

BACKGROUND OF THE INVENTION

In image data processing for images captured by an input device such as a video camera and a digital camera, a high frequency portion of the image data is enhanced. This enhancement process is a type of edge-enhancement and is also called an aperture correction process. For example, referring to FIG. 1, a prior-art system includes an image-capturing device 301 such as a video camera and a digital camera generates image data. The image data includes a Cyan/Yellow (Cy/Ye) signal as well as a Magenta/Green (Mg/G) signal which are respectively an output ratio between elements responsive to Green/Red and Blue/Green in the image-capturing device. In response to the above signals, an interpolation matrix unit 302 outputs a Red (R) signal, a Green (G) signal, a Blue (B) signal as well as light intensity signal Y. The RGB color signals are white balanced by a white balance unit 303, then gamma converted by a gamma-conversion unit 304 and lastly processed by a subtractive primaries matrix unit 305 so as to generate Cr and Cb signals. The Cr signal is a difference betweeen R and Y signals while the Cb signal is a difference between B and Y signals. The Cr and Cb signals are outputted to output devices such as a display device. On the other hand, the light intensity signal Y is processed by an aperture correction device 306.

Still referring to FIG. 1, a prior-art aperture correction device 306 corrects degraded data which includes a high frequency portion representing patterns such as a continuously repeated pattern and an abrupt intensity change pattern. The image data is generally more adversely affected as an aperture size increases. The aperture correction is generally more effective at a low resolution level such as 100 dpi or 100,000 charged-couple device (CCD) elements. The aperture correction device 306 includes a high-pass filtering unit 307 for extracting a high frequency portion of the intensity light signal Y. A coring unit 308 reduces noise of the extracted high frequency portion of the light intensity signal within a predetermined core range. In other words, between the two threshold values, the noise is reduced to zero. A gain adjust unit 309 amplifies the noise reduced signal according to a predetermined gain value. A limiting unit 310 includes a function which has a predetermined maximal output value for any input value above a predetermined positive threshold value as well as a predetermined minimal output value for any input value below a predetermined negative threshold value. The limiting unit 310 outputs a limiting output signal according the above-described function. The aperture correction device 306 finally outputs an enhanced high-frequency portion light intensity signal by adding the limiting output signal to the original relative intensity value. The enhanced high-frequency portion light intensity signal is converted by another gamma conversion unit 311 before outputting to an output device such as a display unit.

Now referring to FIG. 2, another prior-art aperture correction device 400 outputs individual enhanced high-frequency portion light intensity signals for each of the RGB signals. After image data is generated by an image-capturing unit 401, an interpolation matrix unit 402 converts the image data into RGB signals. A white balance unit 403 balances each of the RGB signals. The aperture correction device 400 corrects degraded data which includes a high frequency portion representing patterns such as a continuously repeated pattern and an abrupt intensity change pattern. The aperture correction device 404 includes a set of high pass filtering units 404R, 404G and 404B for extracting a high frequency portion of each of the RGB signals. A set of coring units 405R, 405G and 405B reduces noise of each of the extracted high frequency portion of the RGB signals within a predetermined core range. In other words, between the two threshold values, the noise is reduced to zero. A set of gain adjust units 406R, 406G and 406B each amplifies respective one of the noise reduced RGB signals according to a predetermined gain value. A set of limiting units 407R, 407G and 407B includes a function which has a predetermined maximal output value for any input value above a predetermined positive threshold value as well as a predetermined minimal output value for any input value below a predetermined negative threshold value. The limiting units 407R, 407G and 407B each output a limiting output signal according the above-described function. The aperture correction device 400 finally outputs an enhanced high-frequency portion RGB signals by adding the limiting output signal to the corresponding original RGB signal. The enhanced high-frequency portion RGB signal is converted by a set of gamma conversion units 408R, 408G and 408B before outputting to an output device such as a display unit.

Now referring to FIGS. 3A through 3D, the above-described problem is illustrated in graphs. FIG. 3A illustrates a high frequency portion of an input signal, and FIG. 3B shows the result of an edge enhancement process. The edge enhanced or aperture corrected signal undergoes a gamma conversion process for a given output device. Notice that since the gamma correction is a non-linear conversion process, the aperture corrected signal is not uniformly converted. FIG. 3D shows that the gamma correction process generates uneven results in an input signal to an output device such as a display unit. Because of the uneven input signal, the display unit shows a somewhat darker area as an average intensity level as indicated by a dotted line.

The above described prior-art aperture correction devices performs uniform and fixed corrections on a high-frequency portion of each signal independent of the relative intensity level of the signal. Since these uniform and fixed corrections overcompensate a low relative intensity signal, the overall output image appears to be adversely affected. In order to solve the overcompensation problem, one prior-art reference such as Japanese Laid Patent Publication No. 8-9199 discloses the use of variable coefficients in the correction process. In other words, the disclosures of this prior-art reference teach the use of a low coefficient value for a low intensity signal.

An additional problem in visualizing the corrected image data still exists despite the above-described improved aperture correction. Although the gamma-corrections are necessary for correcting the image data according the gamma characteristics of a given output device, the gamma-corrections often yield washed-out appearance in high-light portions of the image. To avoid the undesirable appearance, the gamma-corrections have been modified in the actual application so as to treat the image data in the high-light portions in a different manner. Because of this special treatment in the gamma-corrections, the intensity in the image data and the output device such as a display monitor is often not linear.

In other words, even though the average light intensity value of the image data after the gamma-corrections is substantially the same as that before the gamma-corrections, the appearance of outputs such as a display image on a display monitor becomes darker or lighter than the original. The discrepancy in perception also occurs when the gamma-corrections are performed before the aperture corrections, and the perceptual discrepancy remains to be improved.

SUMMARY OF THE INVENTION

In order to solve the above and other problems, according to a first aspect of the current invention, a method of edge enhancement, includes the acts of: extracting a first high frequency portion in a first direction of data representative of relative light intensity of a reference pixel; extracting a second high frequency portion in a second direction of data representative of relative light intensity of the reference pixel, the first direction being perpendicular to the second direction; outputting selected data from the first high frequency portion and the second high frequency portion; determining a correction coefficient based upon a sign and a value of the extracted high reference pixel in the data, the sign being indicative of a relation between the relative light intensity of the reference pixel and that of pixels surrounding the reference pixel; and correcting the selected data based upon the correction coefficient.

According to a second aspect of the current invention, system for edge enhancement, includes: an extraction unit for extracting a first high frequency portion in a first direction and a second high frequency portion in a second direction of data representative of relative light intensity of a reference pixel, the first direction being perpendicular to the second direction; a mixing unit connected to said extraction unit for outputting selected data from the first frequency portion and the second high frequency portion; a determination unit connected to said mixing unit for determining a correction coefficient based upon a sign and a value of the reference pixel in of the data, the sign being indicative of a relation between the relative light intensity of the reference pixel and that of pixels surrounding the reference pixel; and a correction unit connected to said determination unit and said extraction unit for correcting the selected data based upon the correction coefficient.

According to the third aspect of the current invention, a method of edge enhancement, including the acts of extracting a high frequency portion of data representative of relative light intensity of a reference pixel; limiting the data based upon a predetermined range to generate limited data; determining a correction coefficient based upon a sign and a value of the reference pixel in the data, the sign being indicative of a relation between the relative light intensity of the reference pixel and that of pixels surrounding the reference pixel; and correcting the limited data based upon the correction coefficient.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 6A and 6B illustrate exemplary arrays of image-capturing elements.

DETAILED DESCRIPTION OF THE PREFERRED EMBODIMENT(S)

Figure 1:
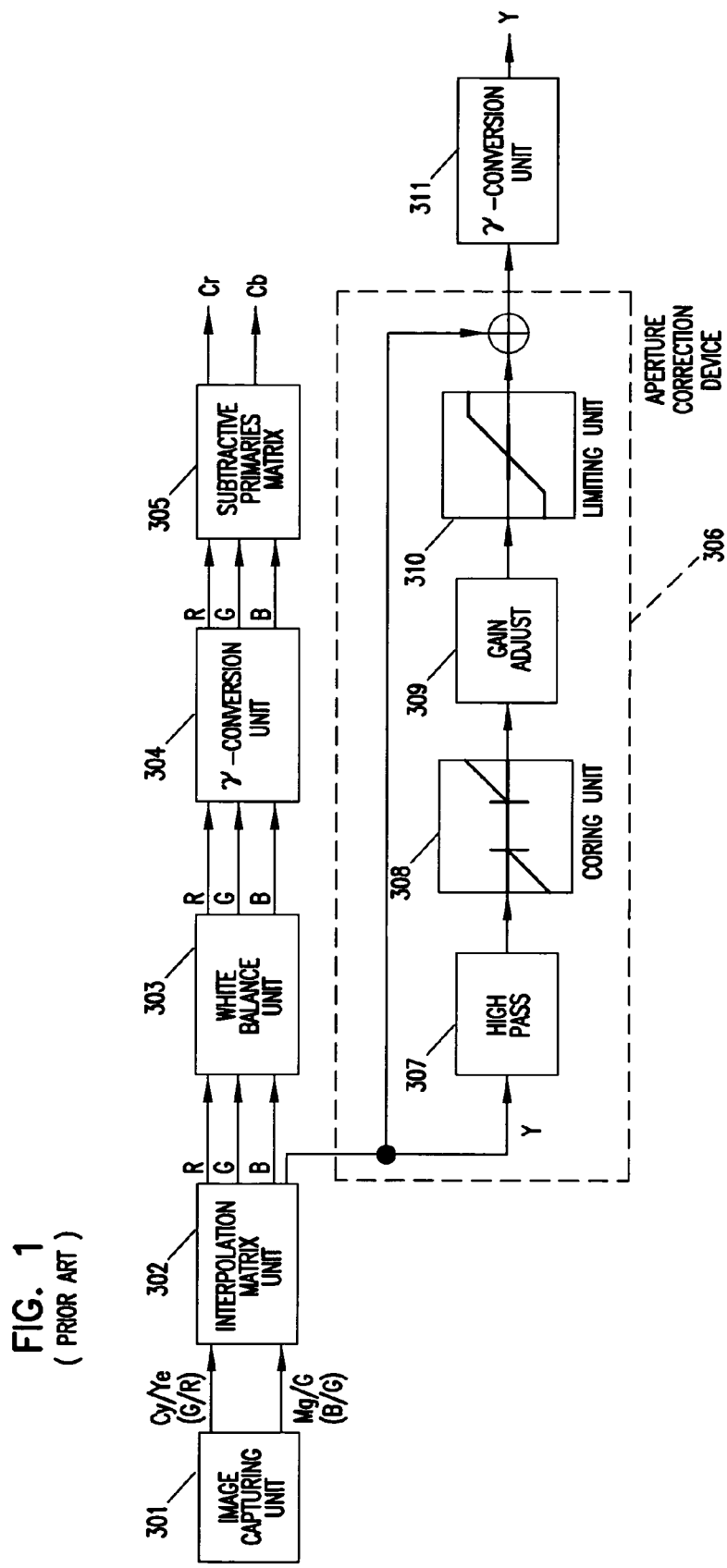
FIG. 1 is a block diagram illustrating a prior-art system for performing an aperture correction process.
Figure 2:
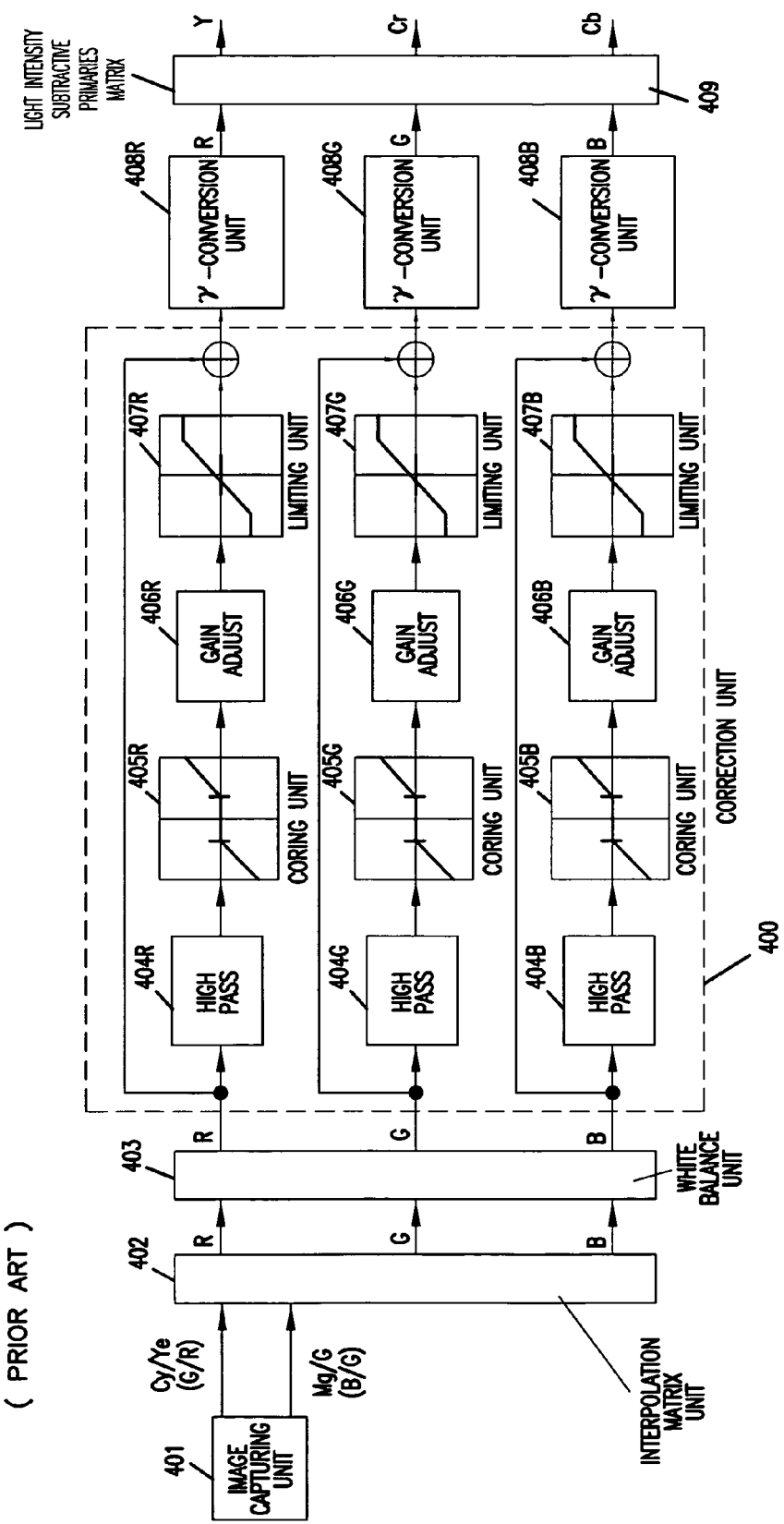
FIG. 2 is a block diagram illustrating another prior-art system for performing an aperture correction process.
Figure 3:
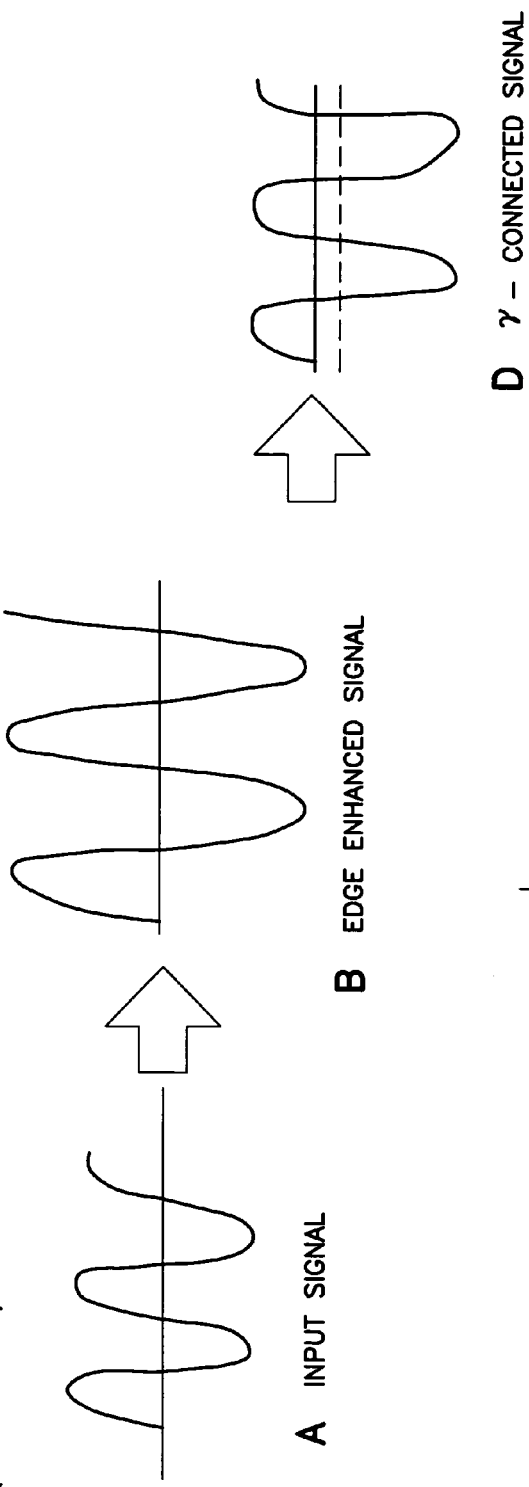
FIGS. 3A–3D illustrate an unsolved problem of prior art aperture correction systems.
Figure 4:
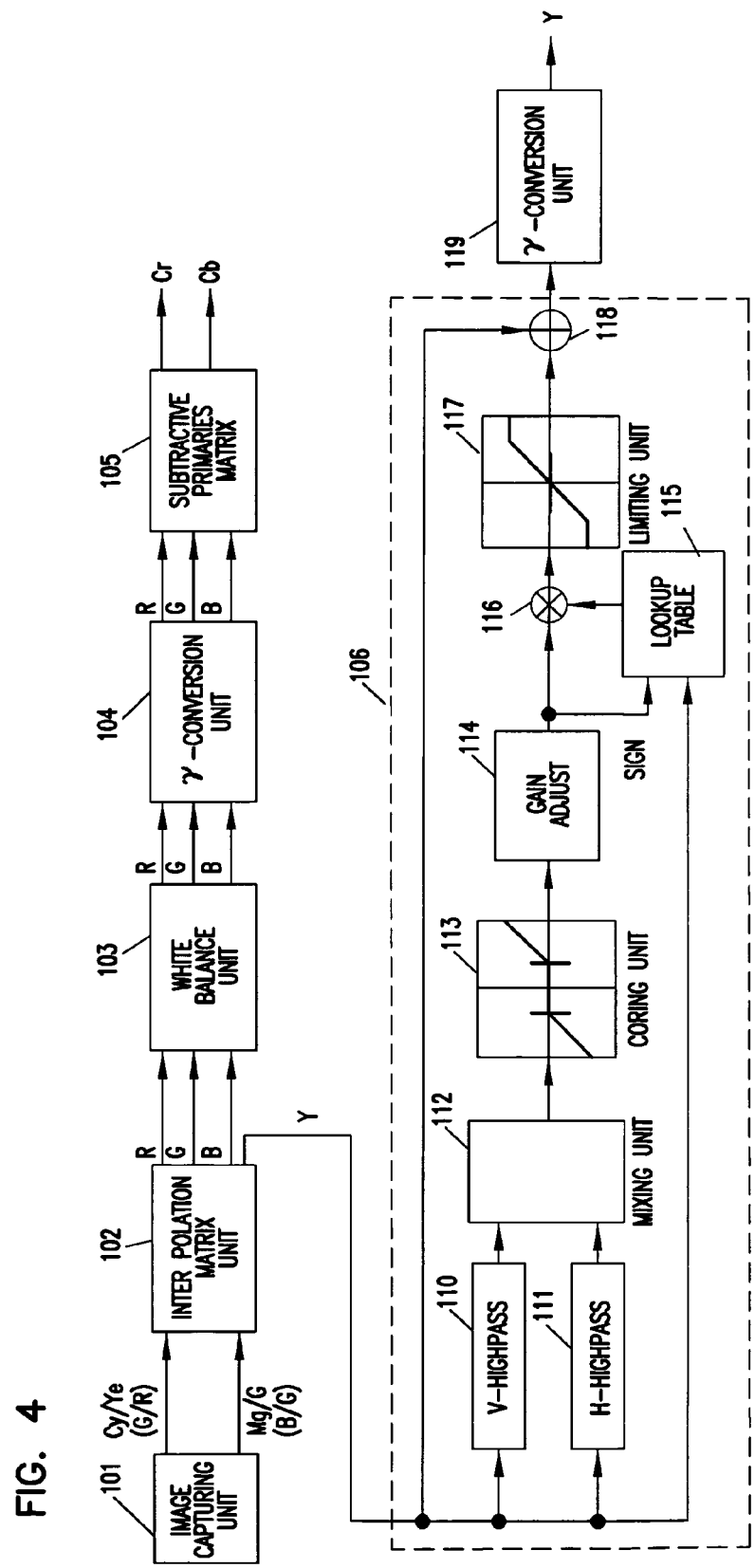
FIG. 4 is a block diagram illustrating a first preferred embodiment of the aperture correction system according to the current invention.

Referring now to the drawings, wherein like reference numerals designate corresponding structure throughout the views, and referring in particular to FIG. 4, a first preferred embodiment of the aperture correction system according to the current invention includes an image-capturing device 101 such as a video camera and a digital camera generates image data. The image data includes a Cyan/Yellow (Cy/Ye) signal as well as a Magenta/Green (Mg/G) signal which are respectively an output ratio between elements responsive to Green/Red and Blue/Green in the image-capturing device. In response to the above signals, an interpolation matrix unit 102 outputs a Red (R) signal, a Green (G) signal, a Blue (B) signal as well as light intensity signal Y. The RGB color signals are white balanced by a white balance unit 103, then gamma converted by a gamma-conversion unit 104 and lastly processed by a subtractive primaries matrix unit 105 so as to generate Cr and Cb signals. The Cr signal is a difference betweeen R and Y signals while the Cb signal is a difference between B and Y signals. The Cr and Cb signals are outputted to output devices such as a display device. On the other hand, the light intensity signal Y is processed by an aperture correction device 106.

Still referring to FIG. 4, the aperture correction device 106 corrects degraded data which includes a high frequency portion representing patterns such as a continuously repeated pattern and an abrupt intensity change pattern. The image data is generally more adversely affected as an aperture size increases. The aperture correction is generally more effective at a low-resolution level such as 100 dpi or 100,000 charged-couple device (CCD) elements. The aperture correction device 106 includes a pair of high-pass filtering units 110 and 111 for extracting a high frequency portion of the intensity light signal Y. The vertical high-pass filtering unit 110 extracts a high frequency portion of the relative light intensity signal in a substantially vertical direction while the horizontal high-pass filtering unit 111 extracts a high frequency portion of the relative light intensity signal in a substantially horizontal direction. A mixing unit 112 compares the absolute values of the vertical and horizontal high frequency portions of the relative light intensity signal. If the absolute values are substantially the same, the average of the two is outputted for further processing by a coring unit 113. On the other hand, if the two values are different, the larger of the two is outputted for further processing by the coring unit 113. The coring unit 113 reduces noise of the extracted high frequency portions of the light intensity signal within a predetermined core range. In other words, between the two threshold values, the noise is reduced to zero. A gain adjust unit 114 amplifies the noise reduced signal according to a predetermined gain value. The gain adjust unit 114 outputs an amplified signal as well as an associated sign signal.

The first preferred embodiment of the aperture correction system according to the current invention includes a look-up table unit 115 which outputs an appropriate correction coefficient. The look-up table unit 115 stores a predetermined set of correction coefficients and selects a multiplication coefficient for a multiplication unit 116 based upon the sign signal and an original relative light intensity signal Y of a reference pixel. The sign is determined by a relation between the relative light intensity of the pixel and that of pixels surrounding the pixel. For example, one implementation is that the sign is positive when a value of the data representative of the relative intensity of a reference pixel is larger than that of surrounding pixels. For the same example, the sign is negative when a value of the data representative of the relative intensity of the reference pixel is smaller than that of surrounding pixels. The multiplication unit 116 multiplies the amplified signal by the selected multiplication coefficient. The product signal is further processed. A limiting unit 117 includes a function which has a predetermined maximal output value for any input value above a predetermined positive threshold value as well as a predetermined minimal output value for any input value below a predetermined negative threshold value. The limiting unit 117 outputs a limiting output signal according the above-described function. An adding unit 118 of the aperture correction device 106 finally outputs an enhanced high-frequency portion light intensity signal by adding the limiting output signal to the original relative intensity value Y. The enhanced high-frequency portion light intensity signal is converted by another gamma conversion unit 119 before outputting to an output device such as a display unit. Because the preferred embodiment of the aperture correction system according to the current invention variably adjusts a correction efficient value based upon the sign and the original relative light intensity value, the aperture correction is optimized, and the average light intensity is maintained before and after the aperture correction for natural appearance of the image.

Figure 5:
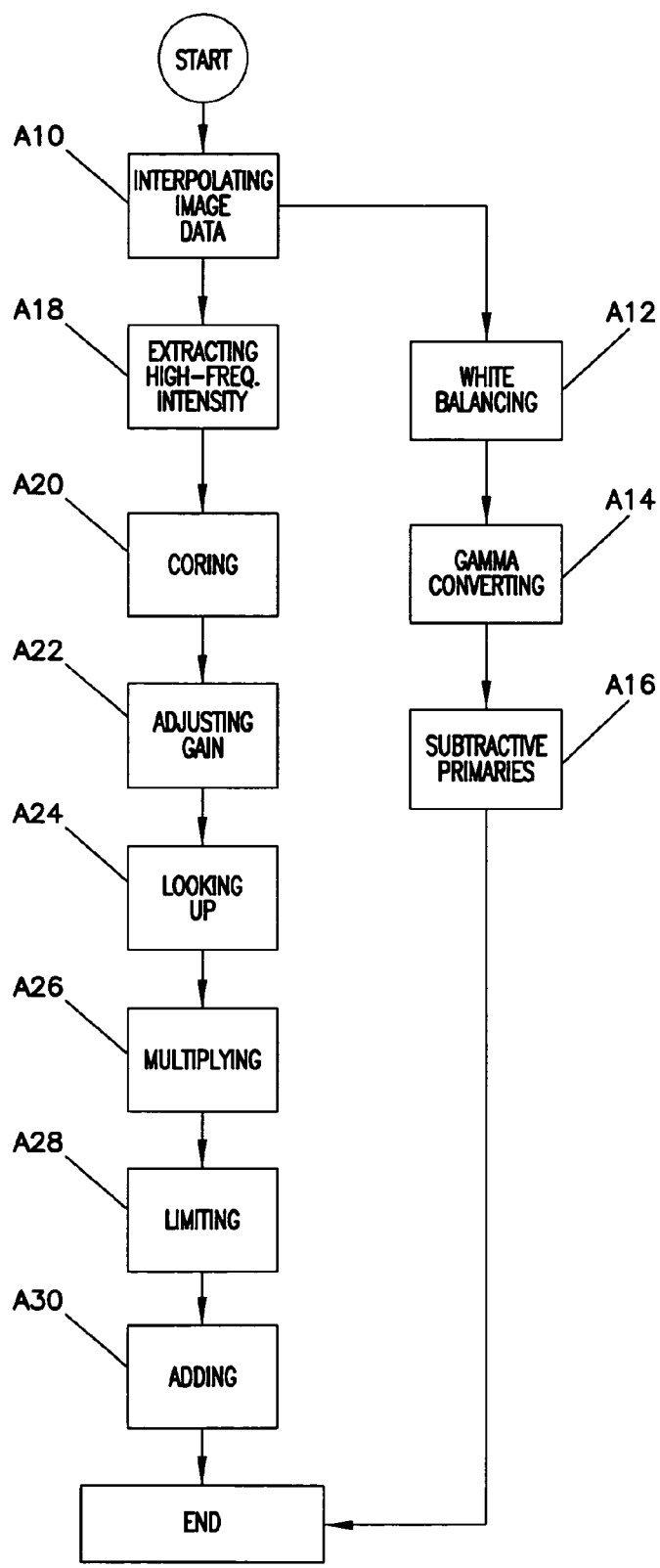
FIG. 5 is a flow chart illustrating acts involved in a first preferred process of performing aperture correction according to the current invention.

Now referring to FIG. 5, a flow chart illustrates acts involved in a first preferred process of performing aperture correction according to the current invention. Some of these acts are described in relation to elements of the first preferred embodiment as illustrated in FIG. 4. An image is captured by an image-capturing unit 101. After the input image data is inputted, the image data is interpolated by an interpolation matrix unit 102 using a predetermined matrix in act A10 so as to generate separate R, G and B signals as well as a relative intensity signal Y. While the RGB signals are further processed by a white balance unit 103 in act A12, the relative light intensity signal Y is used in a different set of acts for aperture correction. The RGB signals are then converted by a gamma conversion unit 104 in act A14 and are finally outputted as Cr and Cb signals after a subtractive primary matrix is applied in act A16. A high frequency portion of the relative light intensity signal is extracted in both vertical as well as horizontal directions in act A18 using the V and H high pass filters 110 and 111. The act A18 involves a comparison of the high frequency portions and selects an average of the two if they are substantially the same or the larger of the two if they are different using the mixing unit 112. Act A20 reduces noise of the extracted high frequency portions of the light intensity signal within a predetermined core range, and act A22 amplifies the noise-reduced signal. In act A24, based upon a sign of the amplified signal and an original value of the relative light intensity signal, a correction coefficient is selected from a set of coefficients. The amplified signal is multiplied by the selected coefficient in act A26. The product is further processed by a limiting unit 117 in act A28 for limiting an output using a predetermined function before the output is added to the original relative light intensity value by an adder unit 118 in act A30. Lastly, the processed value is gamma converted. The acts performed by the aperture correction device 106 can be simultaneously performed while other acts A12, A14 and A16 are performed.

One example of the image-capturing unit 101 includes an array of image-capturing elements as shown in FIGS. 6A and 6B. FIG. 6A illustrates an array of filters for complementary colors while FIG. 6B illustrates an array of filters for primary colors.

Figure 7:
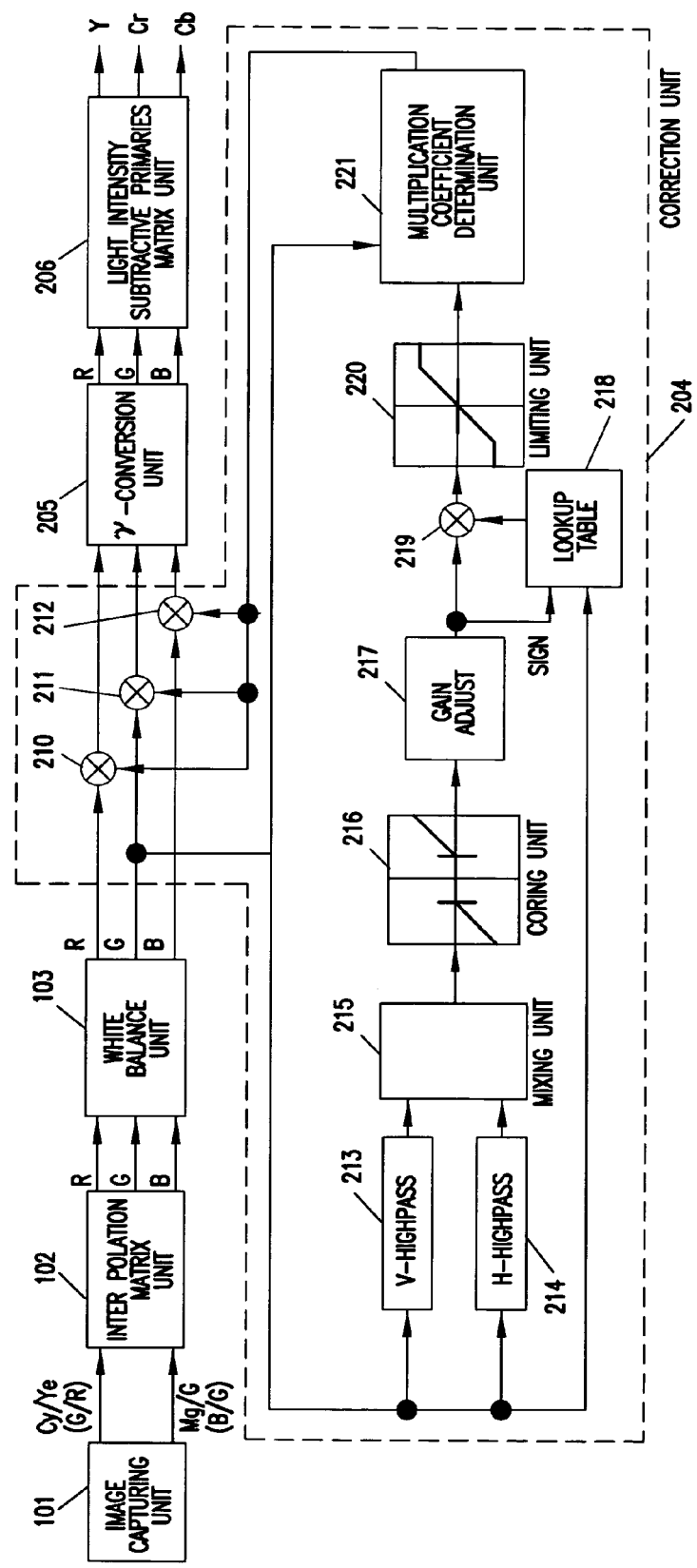
FIG. 7 is a block diagram illustrating a second preferred embodiment of the aperture correction system according to the current invention.

Now referring to FIG. 7, a second preferred embodiment of the aperture correction system according to the current invention includes an image-capturing device 101 such as a video camera and a digital camera generates image data. The image data includes a Cyan/Yellow (Cy/Ye) signal as well as a Magenta/Green (Mg/G) signal which are respectively an output ratio between elements responsive to Green/Red and Blue/Green in the image-capturing device. In response to the above signals, an interpolation matrix unit 102 outputs a Red (R) signal, a Green (G) signal, a Blue (B) signal. The RGB color signals are white balanced by a white balance unit 103. The G signal is further processed by an aperture correction device 204. In other words, the G signal is used to approximate the relative light intensity.

Still referring to FIG. 7, the aperture correction device 204 corrects degraded data which includes a high frequency portion representing patterns such as a continuously repeated pattern and an abrupt intensity change pattern. The image data is generally more adversely affected as an aperture size increases. The aperture correction is generally more effective at a low-resolution level such as 100 dpi or 100,000 charged-couple device (CCD) elements. The aperture correction device 204 includes a pair of high-pass filtering units 213 and 214 for extracting a high frequency portion of the signal G. The vertical high-pass filtering unit 213 extracts a high frequency portion of the G signal in a substantially vertical direction while the horizontal high-pass filtering unit 214 extracts a high frequency portion of the G signal in a substantially horizontal direction. A mixing unit 215 compares the absolute values of the vertical and horizontal high frequency portions of the G signal. If the absolute values are substantially the same, the average of the two is outputted for further processing by a coring unit 216. On the other hand, if the two values are different, the larger of the two is outputted for further processing by the coring unit 216. The coring unit 216 reduces noise of the extracted high frequency portions of the light intensity signal within a predetermined core range. In other words, between the two threshold values, the noise is reduced to zero. A gain adjust unit 217 amplifies the noise reduced signal according to a predetermined gain value. The gain adjust unit 217 outputs an amplified signal as well as an associated sign signal.

The second preferred embodiment of the aperture correction system according to the current invention includes a look-up table unit 218 which outputs an appropriate correction coefficient. The look-up table unit 218 stores a predetermined set of correction coefficients and selects a multiplication coefficient for a multiplication unit 219 based upon the sign signal and the original G signal value. The sign is determined by a relation between the G value of the pixel and that of pixels surrounding the pixel. For example, one implementation is that the sign is positive when a value of the data representative of the G value of a pixel is larger than that of surrounding pixels. For the same example, the sign is negative when a value of the data representative of the G signal of the pixel is smaller than that of surrounding pixels. The multiplication unit 219 multiplies the amplified signal by the selected multiplication coefficient. The product signal is further processed. A limiting unit 220 includes a function which has a predetermined maximal output value for any input value above a predetermined positive threshold value as well as a predetermined minimal output value for any input value below a predetermined negative threshold value. The limiting unit 220 outputs a limiting output signal according the above-described function. A multiplication coefficient determination unit 221 determines a common multiplication coefficient M based upon the limiting output signal from the limiting unit 220 and the original value of the white balanced G signal from the white balance unit 103. One way to determine the common multiplication coefficient M is expressed in the following equation (1):

$$M = 1 + E/G \quad (1)$$

where E is an input signal. The common multiplication coefficient M is outputted to multiplication units 210, 211 and 212 for respectively multiplying the white balanced R, G and B signals by the common multiplication coefficient M. The RGB products are each converted by a gamma-conversion unit 205, and a light intensity subtractive primary matrix unit 206 generates Cr, Cb and an intensity signal Y based upon the converted RGB signals.

Figure 8:
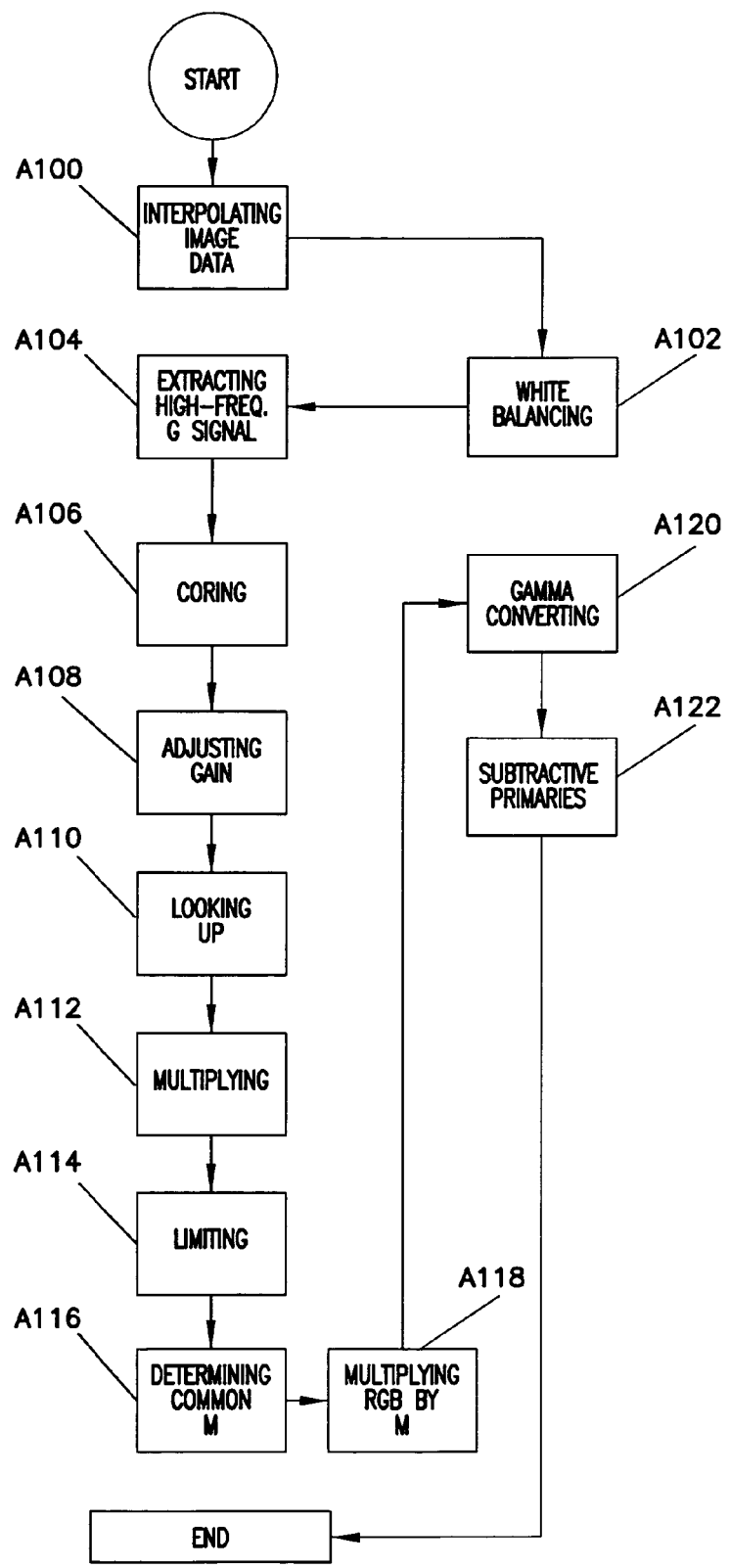
FIG. 8 is a flow chart illustrating acts involved in a second preferred process of performing aperture correction according to the current invention.

Now referring to FIG. 8, a flow chart illustrates acts involved in a second preferred process of performing aperture correction according to the current invention. Some of these acts are described in relation to elements of the second preferred embodiment as illustrated in FIG. 7. An image is captured by an image-capturing unit 101. After the input image data is inputted, the image data is interpolated by an interpolation matrix unit 102 using a predetermined matrix in act A100 so as to generate separate R, G and B signals. The RGB signals are further processed by a white balance unit 103 in act A102. A high frequency portion of the G signal is extracted in both vertical as well as horizontal directions in act A104 using the V and H high pass filters 213 and 214. The act A104 involves a comparison of the high frequency portions and selects an average of the two if they are substantially the same or the larger of the two if they are different using the mixing unit 215. Act A106 reduces noise of the extracted high frequency portions of the G signal within a predetermined core range, and act A108 amplifies the noise-reduced signal. In act A110, based upon a sign of the amplified signal and an original value of the G signal, a correction coefficient is selected from a set of coefficients. The amplified signal is multiplied by the selected coefficient in act A112. The product is further processed by a limiting unit 220 in act A114 for limiting an output using a predetermined function before the output is used in conjunction with the original G value to determine a common multiplication coefficient M in act A116. The RGB signals are each multiplied by the common multiplication coefficient M in act A118 and then converted by a gamma conversion unit 205 in act A120 and are finally outputted as Cr and Cb signals and a relative light intensity Y signal after a light intensity subtractive primary matrix is applied in act A122. The acts performed by the aperture correction device 204 must take place before other acts A120 and A122 are performed.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of edge enhancement, comprising the acts of:
   extracting a first high frequency portion in a first direction of data representative of relative light intensity of a reference pixel;
   extracting a second high frequency portion in a second direction of data representative of relative light intensity of the reference pixel, the first direction being perpendicular to the second direction;
   outputting selected data from the first high frequency portion and the second high frequency portion;
   determining a correction coefficient based upon a sign and a value of the extracted high reference pixel in the data, the sign being indicative of a relation between the relative light intensity of the reference pixel and that of pixels surrounding the reference pixel; and
   correcting the selected data based upon the correction coefficient.

2. The method of edge enhancement according to claim 1 wherein said sign is positive when a value of the data representative of the relative intensity of the reference pixel is larger than that of surrounding pixels.

3. The method of edge enhancement according to claim 1 wherein said sign is negative when a value of the data representative of the relative intensity of the reference pixel is smaller than that of surrounding pixels.

4. The method of edge enhancement according to claim 1 wherein the data representative of the relative light intensity of the reference pixel is obtained from an input signal representative of color green (G) in RGB input signals.

5. The method of edge enhancement according to claim 1 wherein a predetermined set of values is stored in a lookup table for selecting the correction coefficient value.

6. The method of edge enhancement according to claim 1 wherein the first direction and the second direction are respectively horizontal and vertical.

7. The method of edge enhancement according to claim 1 wherein the selected data is an average of the first high frequency portion and the second high frequency portion when the first high frequency portion and the second high frequency portion are substantially similar in absolute value.

8. The method of edge enhancement according to claim 1 wherein the selected data is the larger of the first high frequency portion and the second high frequency portion when the first high frequency portion is substantially different from the second high frequency portion in absolute value.

9. A system for edge enhancement, comprising:
an extraction unit for extracting a first high frequency portion in a first direction and a second high frequency portion in a second direction of data representative of relative light intensity of a reference pixel, the first direction being perpendicular to the second direction;
a mixing unit connected to said extraction unit for outputting selected data from the first frequency portion and the second high frequency portion;
a determination unit connected to said mixing unit for determining a correction coefficient based upon a sign and a value of the reference pixel in of the data, the sign being indicative of a relation between the relative light intensity of the reference pixel and that of pixels surrounding the reference pixel; and
a correction unit connected to said determination unit and said extraction unit for correcting the selected data based upon the correction coefficient.

10. The system for edge enhancement according to claim 9 wherein said sign is positive when a value of the data representative of the relative intensity of the reference pixel is larger than that of surrounding pixels.

11. The system for edge enhancement according to claim 9 wherein said sign is negative when a value of the data representative of the relative intensity of the reference pixel is smaller than that of surrounding pixels.

12. The system for edge enhancement according to claim 9 wherein the data representative of the relative light intensity of the reference pixel is obtained from an input signal representative of color green (G) in RGB input signals.

13. The system for edge enhancement according to claim 9 wherein said determination unit further comprises a look up table storing a predetermined set of values for selecting the correction coefficient value.

14. The method for edge enhancement according to claim 9 where the first direction and the second direction are respectively horizontal and vertical.

15. The system for edge enhancement according to claim 9 wherein the selected data is the larger of the first high frequency portion and the second high frequency portion when the first high frequency portion is substantially different from the second high frequency portion in absolute value.

16. The system for edge enhancement according to claim 9 wherein the selected data is an average of the first high frequency portion and the second high frequency portion when the first high frequency portion and the second high frequency portion are substantially similar in absolute value.

17. A method of edge enhancement, comprising the acts of:
extracting a high frequency portion of data representative of relative light intensity of a reference pixel;
limiting the data based upon a predetermined range to generate limited data;
determining a correction coefficient based upon a sign and a value of the reference pixel in the data, the sign being indicative of a relation between the relative light intensity of the reference pixel and that of pixels surrounding the reference pixel; and
correcting the limited data based upon the correction coefficient.

18. The method of edge enhancement according to claim 17 wherein said sign is positive when a value of the data representative of the relative intensity of the reference pixel is larger than that of surrounding pixels.

19. The method of edge enhancement according to claim 17 wherein said sign is negative when a value of the data representative of the relative intensity of the reference pixel is smaller than that of surrounding pixels.

20. The method of edge enhancement according to claim 17 wherein the data representative of the relative light intensity of the reference pixel is obtained from an input signal representative of color green (G) in RGB input signals.

21. A system for edge enhancement, comprising:
an extraction unit for extracting a high frequency portion of data representative of relative light intensity of a reference pixel;
a limiting unit connected to said extraction unit for limiting data based upon a predetermined range and for generating limited data;
a determination unit connected to said limiting unit for determining a correction coefficient based upon a sign and a value of the reference pixel in of the data, the sign being indicative of a relation between the relative light intensity of the reference pixel and that of pixels surrounding the reference pixel; and
a correction unit connected to said determination unit and said limiting unit for correcting the limited data based upon the correction coefficient.

22. The system for edge enhancement according to claim 21 wherein said sign is positive when a value of the data representative of the relative intensity of the reference pixel is larger than that of surrounding pixels.

23. The system for edge enhancement according to claim 22 wherein said sign is negative when a value of the data representative of the relative intensity of the reference pixel is smaller than that of surrounding pixels.

24. The system for edge enhancement according to claim 22 wherein the data representative of the relative light intensity of the reference pixel is obtained from an input signal representative of color green (G) in RGB input signals.

* * * * *